(12) United States Patent
Webb et al.

(10) Patent No.: US 8,432,601 B2
(45) Date of Patent: Apr. 30, 2013

(54) ELECTROCHROMIC DISPLAY MODULE AND COMPOSITION WITH IMPROVED PERFORMANCE

(75) Inventors: Steven Paul Webb, Maple Grove, MN (US); Dennis Brestovansky, Eden Prairie, MN (US); Craig Richard Berry, Minneapolis, MN (US); John Russell Kingery, Eden Prairie, MN (US)

(73) Assignee: Gemalto, S.A., Meudon Cedex (FR)

( * ) Notice: Subject to any disclaimer, the term of this patent is extended or adjusted under 35 U.S.C. 154(b) by 635 days.

(21) Appl. No.: 12/434,379

(22) Filed: May 1, 2009

(65) Prior Publication Data

US 2010/0277788 A1 Nov. 4, 2010

(51) Int. Cl.
*G02F 1/15* (2006.01)

(52) U.S. Cl.
USPC .......................................... 359/265; 359/267

(58) Field of Classification Search .................. 359/265, 359/267
See application file for complete search history.

(56) References Cited

U.S. PATENT DOCUMENTS

| | | | |
|---|---|---|---|
| 4,210,390 A | 7/1980 | Yaguchi | |
| 4,652,090 A | 3/1987 | Uchikawa | |
| 5,471,337 A | 11/1995 | Babinec | |
| 6,373,618 B1 | 4/2002 | Agrawal et al. | |
| 6,639,709 B2 | 10/2003 | Vincent | |
| 6,744,549 B2 | 6/2004 | Vincent | |
| 6,879,424 B2 | 4/2005 | Vincent | |
| 7,054,050 B2 | 5/2006 | Vincent | |
| 7,547,658 B2 | 6/2009 | Liu | |
| 7,551,346 B2 | 6/2009 | Fazel | |
| 7,560,173 B2 | 7/2009 | Brugger | |
| 7,561,324 B2 | 7/2009 | Duthaler | |
| 7,567,371 B2 | 7/2009 | Corr | |
| 2002/0005977 A1 | 1/2002 | Guarr et al. | |
| 2003/0195269 A1 | 10/2003 | Armand et al. | |
| 2006/0007519 A1 | 1/2006 | Kanouni et al. | |
| 2006/0146271 A1 | 7/2006 | Pennaz | |
| 2006/0222976 A1* | 10/2006 | Yang et al. | 430/32 |
| 2006/0227523 A1 | 10/2006 | Pennaz | |
| 2006/0227669 A1 | 10/2006 | Pennaz | |
| 2008/0266642 A1 | 10/2008 | Burrell et al. | |
| 2009/0161194 A1 | 6/2009 | Pennaz | |

FOREIGN PATENT DOCUMENTS

WO 97/38350 A1 10/1997

OTHER PUBLICATIONS

Kosuke Izutsu, in "Electrochemistry in Nonaqueous Solutions," Wiley-VCH, 2003, 12 pgs.

* cited by examiner

*Primary Examiner* — James Jones
(74) *Attorney, Agent, or Firm* — Oliver A. M. Zitzmann

(57) ABSTRACT

An electrochromic display module employing a unique combination of architecture and electrochromic composition to provide an extended life to the module. The architecture may involve the use of an extended seal about a perimeter of a display portion where the composition is located. In this manner, the rate of solvent leakage from the composition may be substantially reduced. Additionally, the electrochromic composition itself may make use of particular low volatility solvents and constituent combinations so as to discourage the amount particle generation therein. Ultimately, an electrochromic display module having a useful life of more than about 3 years may be provided.

18 Claims, 3 Drawing Sheets

ELECTROCHROMIC DISPLAY MODULE AND COMPOSITION WITH IMPROVED PERFORMANCE

FIELD

Embodiments described herein relate to electronic display modules such as banking cards, tracking cards, and other types of display cards for which an electrochromic display may be beneficial. In particular, modules that employ a unique combination of architecture and electrochromic ink compositions are described herein.

BACKGROUND

Bank cards, credit cards and other forms of electronic data cards have become more sophisticated over the years. In particular, it is now becoming more common to find display technology incorporated into such cards as well as other forms of smart cards, smart labels, and a variety of other devices. In this manner, such card devices may include a user-friendly display that may be employed in conjunction with the card. For example, the display may allow the card user to take advantage of security features such as one-time password (OTP) generation.

Unlike a laptop computer, personal digital assistant (PDA), or even a cell phone, electronic data cards, such as a conventional bank card, are generally lower cost items. That is, they may be mass produced and stored in bulk as "blanks", devoid of any substantial electronic data prior to activation. In the case of a bank card, customer account access information may be loaded onto the card at the time of activation, for example, by the bank teller or the customer. Barring activation, however, the card remains a small, otherwise disposable, shelved blank of minimal value, with perhaps little care afforded to its manner of storage.

In light of the nature of electronic data cards as noted above, larger, more sophisticated, higher cost, and less durable display technology options may be avoided in providing display capacity thereto. For example, higher cost liquid crystal display (LCD), organic light-emitting diode (OLED), electroluminescence (EL), field emission display (FED), and other display technologies may be avoided. Rather, as noted below, the generally more durable, lower cost option of electrochromic display technology is often preferred.

An electrochromic display is one in which an electrochemical reaction takes place through an electrochromic composition which includes an electro-active ink material. In this manner, pixels are activated to display a pattern in the form of letters, numbers, or other symbols. The display itself is of a stacked configuration that includes a transparent conductive frontplane positioned over a backplane. The backplane serves as a substrate to accommodate circuitry for creating the image of the display, whereas the electrochromic composition is provided thereon, sandwiched between the backplane and the transparent conductive frontplane. An adhesive seal is also positioned between the backplane and the frontplane at a perimeter about the electrochromic composition so as to help keep the composition in place.

The above noted electrochromic composition is made up of a conventional polymer and solvent with electro-active, color-changing components and opacifier disbursed therein. Additionally, a pouring agent, generally silicon dioxide (fumed silica), is added to the composition as an aid in manufacturing of the display card. A variety of other agents may also be incorporated into the composition to help tailor reactivity, rheology, and other characteristics thereof. However, the overall life of the display card is largely determined by how long the composition is able to retain its fluid character. That is, visible perception of induced electrochromaticity through the display diminishes as the fluidity of the composition is reduced. Similarly, the emergence of large particles generated within the composition may inhibit the visibility of an image generated by the display.

As noted above, the composition is held in place between the frontplane and backplane by a conventional adhesive seal. Further, the fluid character of the composition is provided primarily by the solvent. Unfortunately, adhesive seals are susceptible to leakage by a composition's solvent over time. For example, a conventional solvent such as propylene carbonate may initially make up about 40% of the composition. However, depending on a variety of factors, such as adhesive choice and seal design, it would not be uncommon to see such a composition with solvent at 12% or less of the total composition over the course of about 1 to 3 years from manufacture. In such cases, the visualization of the display would no longer be effective.

Additionally, depending on solvent and polymer choice, the utilization of too much pouring agent such as fumed silica tends to induce particle generation over time. For example, in many cases particles of inconsequential size may be present in the composition, but they further have a tendency to 'flocculate' with fumed silica and grow in size. These generally harmless particles of inconsequential size may be a result of initial polymer-ink interactions, as is often the case where polyethylene oxide (PEO) and titanium dioxide (titania) are employed. These particles may be of limited size, having no direct effect on visualization of the display image. However, over time these initial particles tend to flocculate with pouring agents such as fumed silica. In certain circumstances this may eventually result in substantial particle generation which may include particles in excess of 100 to 200 microns in size.

With a substantial amount of particle generation of such large particles as noted above, visualization of an image at the display may be impossible. In any case, between the combined problems of substantial particle generation and solvent leakage, a conventional electrochromic display card may have a useful life of substantially less than about 3 years. As a result, electrochromic display cards remain fairly impractical for every day longer term use, such as in the form of a credit card.

SUMMARY

An electrochromic display device of improved performance is provided. The improved display may include effective visibility in excess of three years. Such improvements may be achieved through use of an electrochromic composition that employs a solvent with a volatility of less than about 0.03 torr at 20° C. in which polymer is solublized. Acceptable solvent/polymer solubility is further preferred to diminish particle formation from, for example, flocculation or polymer dissolution or crystallization. Additionally, the display portion of the device may be provided at a backplane thereof for accommodating the composition. A seal disposed across a majority of the backplane may also be provided. The seal may define a perimeter of the display and help to isolate the electrochromic composition in place. The seal is further used to hinder loss of solvent from the electrochromic composition.

DETAILED DESCRIPTION

Embodiments are described with reference to certain electrochromic display modules. In particular, modules for use as cards such as credit, debit, identification, and other ISO compliant hand-held card types are described. However, a variety of other module types such as greeting card displays may employ these or similar embodiments of architecture and electrochromic compositions as detailed herein. Regardless of the module or card type, the unique combination of architecture and electrochromic compositions employed may extend the useful life of the display to substantially beyond three years. Thus, embodiments described herein are particularly well suited for use in hand-held cards for every day use.

Figure 1A:
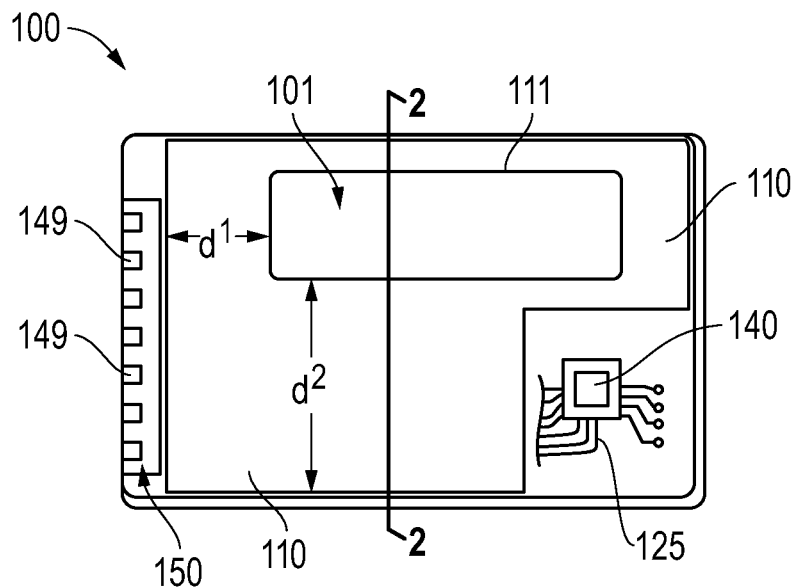
FIG. 1A is a perspective, partially-sectional view of an embodiment of an electrochromic display module.
Figure 1B:
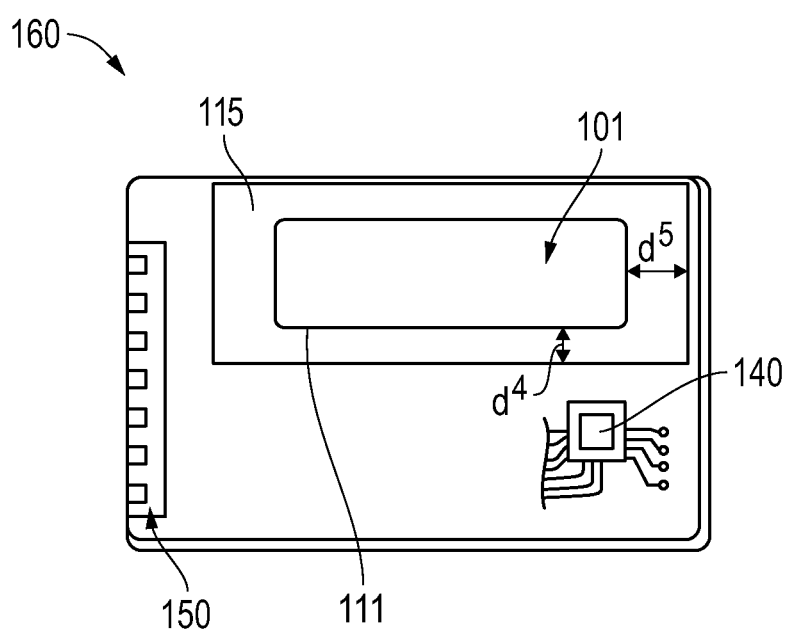
FIG. 1B is a perspective, partially-sectional view of an alternate embodiment of an electrochromic display module.

With reference now to FIGS. 1A and 1B, perspective, partially-sectional views of embodiments of electrochromic display modules 100, 160 are depicted. As noted, the modules 100, 160 may be appropriately sized and configured for use as, or incorporation into, a conventionally sized electronic card. For example, in one embodiment the display modules 100, 160 may be relatively flexible devices of less than about 1.5 square inches and suitable for integration into a standard display card of less than about 8 square inches, for example, via hot lamination.

Figure 2:
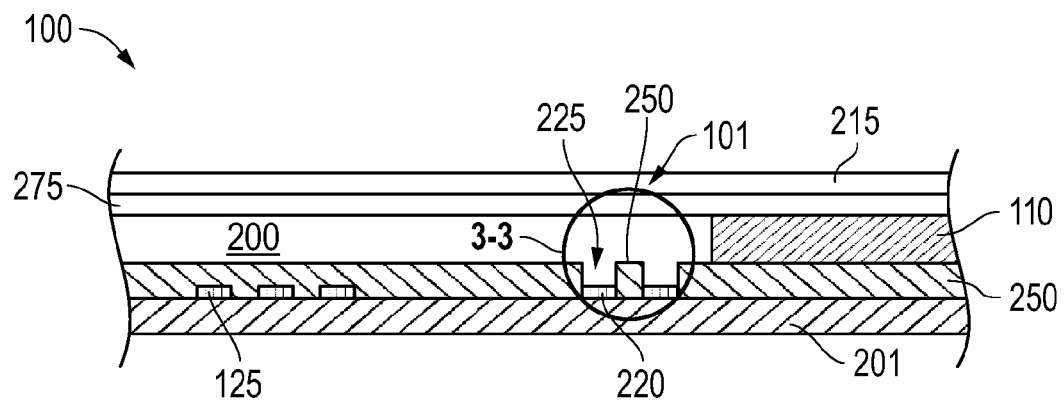
FIG. 2 is a side, cross-sectional view of the electrochromic display module taken from 2-2 of FIG. 1A.

With added reference to FIG. 2, the modules 100, 160 of FIGS. 1A and 1B may include a display portion 101 where a visual display may be generated by the activation of pixels (see 225). In one embodiment, the modules 100, 160 are configured to generate up to about 6 digits via 42 pixels in this manner. The visual display at the display portion 101 may be directed by a microcontroller 140 which may be incorporated directly into the body of the module 100, 160 at a backplane 201 thereof. More specifically, circuit lines 125 from the microcontroller 140 may run to the display portion 101 to direct imaging through an electrochromic display composition 200 thereat. A seal 110, 115, detailed further below, may be provided between the backplane 201 and the frontplane 215 about a perimeter 111 of the display portion 101 so as to help retain the composition 200 in place.

In addition to the microcontroller 140 and circuitry, other components such as resistors, a battery, sensor, switch, radio frequency antenna or crystal may be accommodated by the noted backplane 201. Indeed, as depicted in FIGS. 1A and 1B, a conventional bus 150 may be incorporated into the body of the module 100, 160. The bus 150 may be employed to provide electrical connectivity between features of the display module 100, 160, such as the microcontroller 140, and other features external to the module 100, 160. For example, the bus 150 may be electrically coupled through contacts 149 to a power source or other optional components such as an additional processor, membrane switches, a biometric sensor, or an interactive read/write device such as a conventional RFID antenna. In this manner, for example, an external power source may be run from the contacts 149 to the microcontroller 140 and ultimately to the display portion 101 via circuit lines 125 for powering and generating the desired image through the composition 200 thereat.

Figure 3:
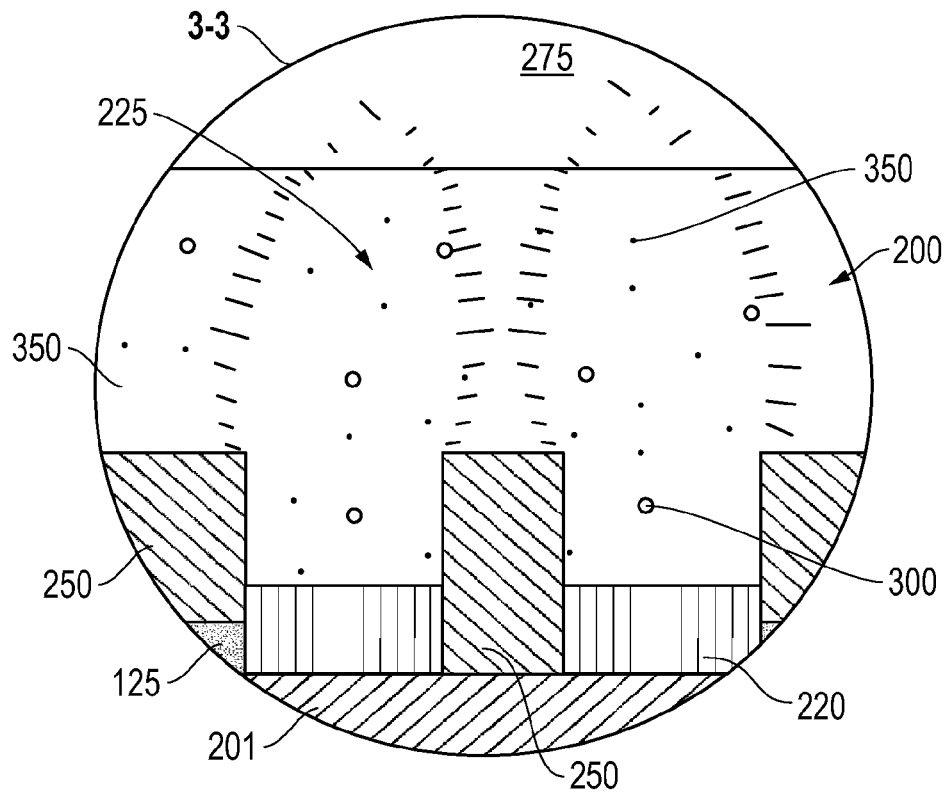
FIG. 3 is an enlarged view of an embodiment of an electrochromic display and composition taken from 3-3 of FIG. 2.

With added reference to FIG. 3, the above-noted composition 200 includes electrochromic ink components and opacifier, 350, disbursed in a polymer-solvent mixture. The ink material 200 may be selectively activated in order to generate an image at the display portion 101. Additionally, with particular reference to the embodiment of FIG. 1A and as detailed further below, a seal 110 may be employed that is particularly configured to substantially reduce the rate of solvent leakage from the composition 200 to beyond the display portion 101. Thus, as described below, the life of the module 100 may be extended, particularly when the types of compositions 200 detailed herein are employed.

Referring specifically now to the embodiment of FIG. 1A in contrast to that of FIG. 1B, the seals 110, 115 are noticeably different in dimensions. In particular, the seal 110 of FIG. 1A appears to extend across the majority of the module 100, whereas the seal 115 of FIG. 1B is of a more conventional size, limited to the nearer proximity of its display portion 101. While the composition 200 in the display portion 101 of FIG. 1B, presents a particular embodiment, as detailed with respect to FIG. 2 both the composition 200 and the seal 110 of FIG. 1A are a preferred embodiment. As a result, the useful life of the module 100 of FIG. 1A may exceed that of FIG. 1B.

Dimensionally speaking, the seal 115 of FIG. 1B may extend away from the display portion 101 to a vertical distance $d^4$ by a horizontal distance $d^5$. This fairly standard and uniform dimensions of the seal 115 as depicted may translate to no more than about 0.075 inches by about 0.12 inches. By way of comparison, however, the seal 110 of FIG. 1A may be extended beyond such dimensions, even without changing the location of the display portion 101 or the overall dimensions of the module 100. More specifically, the seal 110 of FIG. 1A may have dimensions that include a variety of extended reach distances $d^1$, $d^2$, as compared to the more standard distances $d^4$, $d^5$ of the seal 115 of FIG. 1B. In the embodiment shown, this may include a vertical extended reach distance of over 0.075 inches, preferably over about 0.5 inches, and a horizontal extended reach distance $d^1$ of more than about 0.12 inches, preferably between about 0.15 inches and about 0.20 inches or more.

In addition to the benefits afforded by the seal 110 in terms of solvent loss as noted below, the resulting change in underlying architecture of the module 100 may also be of benefit. For example, the increased size of the seal 110 provides structural support for follow-on lamination and other processing. Additionally, the larger seal 110 provides a broader base of support for module layers immediately thereabove (see the transparent frontplane 215 and conductive layer 275 of FIG. 2).

With added reference to FIG. 2, utilization of the described extended reach distances $d^1$, $d^2$ from at least two sides of display portion 101 may substantially reduce solvent leakage from the composition 200 thereat. Thus, the effective life of the module 100 itself may be lengthened. Indeed, in one embodiment where a conventional solvent is employed and extended reach distances $d^1$ and $d^2$ extending beyond about 0.15 inches by about 0.5 inches are utilized, an 80% reduction in the rate of solvent loss may be seen. This reduction in the solvent loss rate may be attributable to the substantial reduction in leakage through and/or around the seal 110 and the reduced likelihood of seal rupture as a result of such distances $d^1$, $d^2$ being employed.

Continuing now with reference to FIG. 2, a side cross sectional view of the electrochromic display module 100 is shown taken from 2-2 of FIG. 1A. FIG. 2 reveals that the module 100 employs the dimensionally extended seal 110 in conjunction with an embodiment of an electrochromic display composition 200 configured for reduced particle generation. As described herein, the effective imaging life may be extended to substantially beyond about three years for such an embodiment of a module 100. That is, in addition to a reduction in solvent leakage from the composition 200 as afforded by the seal 110, the module 100 employs a composition 200 with an extended imaging life due to a significant reduction in particle generation as described below.

Continuing with reference to FIG. 2, with added reference to FIG. 1A, the above noted display portion 101 is of a stacked configuration. The transparent frontplane 215 is shown as the top layer of the display portion 101 with an underlying conductive layer 275 formed thereon. The frontplane 215 is ultimately joined to the backplane 201 through a variety of techniques such as the use of pressure sensitive adhesives, heat seals, and epoxy seals. Indeed, the above described seal 110 is one such mechanical seal of an acrylic variety, preferably 3-5 mils in thickness. In addition to the features of the seal 110 as noted above, it defines the height between the backplane 201 (with dielectric 250) and the frontplane 215 (with underlying conductive layer 275). As detailed below, unique embodiments of compositions 200 may be disposed between these planes 201, 215. These embodiments may ultimately provide for an extended imaging life due to a substantial reduction in particle generation therein.

Continuing now with the frontplane 215 and conductive layer 275, these components may be electrically connected via conductive adhesive, for example, to a negative terminal of a battery and grounded, serving as the negative anode electrode for the module 100. Further, the conductive layer 275 may be of thin gold layers or gridlines or more preferably, a transparent conductor, such as indium tin oxide (ITO), initially deposited on the frontplane 215 through conventional metallization or sputtering. Such a conductor deposited in this manner may result in a substantially transparent substrate for use in a display module 100 as shown.

The noted backplane 201 may be polymeric in nature. Materials for the backplane 201 may include any of a polyester, a polyimide, polypropylene, acrylate, polyolefin, polyethylene naphthalate, polycarbonate, and polyvinylchloride. Additionally, the circuitry 125 on backplane 201 may be selectively connected to a positive battery terminal and terminated at a pixel electrode, 220, to serve as the positive cathode electrode for the module 100. As alluded to above and detailed further below, a chemical reaction may thus be directed between the frontplane 215 and the backplane 201, through the medium of the electrochromic composition 200, in order to generate an image at the display portion 101.

The above noted circuit lines 125 may run to a variety of pixel electrodes 220 for the indicated image generation. The lines 125 may be of gold, copper, silver, tin, platinum, palladium, chromium, zinc, or other suitable metal. The pixel electrode material is selected so as to be non-reactive with the electrochromic composition, 200. Such unreactive materials are carbon or preferably gold. The lines 125 are coupled to the microcontroller 140 which is prefabricated and preprogrammed with firmware required for image generation. Thus, as noted, the microcontroller 140 may be positioned at the backplane 201 and connected electrically through flip chip die attach techniques and physically coupled thereto with a conventional encapsulant.

Referring now to FIG. 3, with added reference to FIG. 2, an enlarged view primarily of an embodiment of an electrochromic display composition 200 is depicted which is taken from 3-3 of FIG. 2. In this view, the activated nature of the composition 200 at the pixel 225 is indicated by the 'flashing' appearance in this portion of the composition 200. Of particular note, within this portion of the composition 200 are certain particles 300 which are limited in size to less than about 150 microns so as to remain visibly imperceptible. As a result of utilizing a composition 200 with such limited particle generation, the effective life of the module 100 may be extended. Indeed, when such a composition 200 is combined with an extended seal 110 as detailed above, the effective module life may be well over three years.

As with many conventional electrochromic compositions, the above noted electrochromic composition 200 may include a solvent-polymer mixture with electrochemically active and color affecting components disbursed therein. Some of the components may be solids with a size similar to the opacifier 350. For a more conventional composition, a pouring agent such as silicon dioxide (fumed silica) may also be present. This is done to enhance processing and pouring character of such a composition. Unfortunately, as noted above, this leads to excessive particle generation and visualization problems over the life of the display. However, the electrochromic composition 200 of embodiments described herein-below is made up of a solvent-polymer mixture that allows for the substantial elimination of pouring agents such as fumed silica. As a result, particles 300 which may naturally generate within the composition 200 may be limited in size to less than about 150 microns (e.g. and thus be visibly imperceptible). Indeed, a substantial majority of such particles 300 may be less than about 25 microns in size. While particle generation may be a naturally occurring phenomenon as described below, the limited size of such particles 300 leaves them visually imperceptible, thereby allowing the pixel 225 to remain effective for imaging purposes.

Continuing with reference to FIG. 3, the pixel 225 is shown as activated by a potential across the pixel electrodes 220 and conductive layer 275 through techniques described above. As such, the electro-active, color-changing components of the composition 200 is visibly activated in the pixel 225 area. In an exemplary embodiment, the electro-active composition 200 consists of a redox couple that generates a pH change upon activation and a pH sensitive dye and an opacifier (350). Other color-changing electrochemical compositions are also possible. Opacifier component 350 is, for example, titanium dioxide (titania). More significantly, however, the polymer-solvent mixture into which the electro-active composition is disbursed may substantially limit particle generation as noted below.

The solvent-polymer mixture of the composition 200 generally employs a conventional polymer such as polyethylene oxide (PEO), for example 100,000 molecular weight PEO. However, the solvent selected for the mixture has properties that substantially avoid the flocculation of polymer and electro-active composition component 350 into particles 300. Thus, the amount of generated particles 300 is kept to a minimum. Furthermore, the solvent may have properties that serve to aid in pouring. Thus, the addition of a separate pouring agent to the composition 200 may be largely eliminated. As such, continued flocculation of particles 300 with a pouring agent such as fumed silica may be substantially avoided, thereby keeping particle sizes to less than about 25 to 150 microns as noted above.

In one embodiment, solvents, which may be employed to minimize flocculation and allow the substantial elimination of pouring agent, may be those which are of relatively low volatility, perhaps less than about 0.03 torr at about room temperature. These solvents should further be electrochemically stable. Such solvents serve well as electrochromic media for displays. In addition, the solvents must be effective at solubilizing the polymer, for example polyethylene oxide (PEO). Good solvents are those that resist the recrystallization of crystalline polymers, such as PEO. For example, good solvents of this invention are such that a solution of a 25 wt. % loading of 100K molecular weight PEO in the solvent, dissolved at 65° C., will not turn opaque (via the formation of light scattering crystals or insolubilized polymer) nor gel after sitting at room temperature for 24 hours. These solvents may include sulfones such as tetramethylene sulfone as well as ethylene glycol phenyl ether, and propylene glycol phenyl ether. Water is a good solvent according to this definition with regard to polymer solubility, however it is a poor solvent choice with regard to room temperature vapor pressure and electrochemical stability.

The above noted solvents may also provide a character to the composition 200 which allows for the substantial elimination of fumed silica therefrom. Namely, given the conventional addition of fumed silica as a pouring agent, this may now be obviated by the use of solvents that well-solubilize the polymer. Such combinations tend to naturally thicken and enhance the pouring character of the composition 200. Thus, with the exception of a small amount of fumed silica which often accompanies polymers, such as PEO, from the supplier, no other fumed silica or pouring agent is required. This pouring agent additive may thus be ultimately reduced to no more than about 0.5% of the composition 200. As such, the tendency for particle generation to exceed 25 to 150 microns in size is substantially eliminated, particularly over the course of a three year operational life of a module 100, such as that in FIG. 1A.

Continuing with reference to FIG. 3 and in light of that above, one embodiment of the electrochromic composition 200 may include 10-15% polymer such as 100,000 molecular weight PEO with 30-50% low volatility solvent as described above. The remaining 35-65% of the composition 200 may be made up primarily of electro-active composition components, including opacifier 350, such as titania. Further, as noted above, less than about 0.5% pouring agent may be found in the composition, preferably none. Employing such a composition 200 substantially eliminates the generation of particle sizes exceeding 150 microns (defect particles), particularly over the 1-3 year timeframe. Furthermore, when such a composition 200 is combined with use of an extended seal 110 as detailed above with respect to FIG. 1A, the useful life of an electrochromic display module 100 may be extended to more than about 3 years as measured by the visibility and clarity of the display 101. Defect particles exceeding 150 microns in diameter are readily discernable, especially when the particles are inactive (non-coloring) and positioned near the display plane.

In addition, the modulation depth is often reduced as the solvent is reduced in an electro-active composition. Modulation depth is determined by the difference in reflectivity of the off-state display pixel relative to the on-state display pixel (measured in candelas/m$^2$, for example), when determined by a calibrated reflectometer. Originally produced displays, made with an electro-active composition having ~40% solvent, can be driven electrically with a 3V source to yield a modulation depth of 50 candelas/m$^2$ without significant coloration outside of the region defined by the pixel electrode. Further, this composition 200 may remain substantially free of visible particle generation and be driven in the same manner as when it was originally made to have a modulation depth of greater than 20 candelas/m$^2$ while the solvent is in excess of about 25%, as based on total composition weight. So, for example, this may correspond to maintaining at least about 50% of the original solvent amount. This may further correspond to maintaining a modulation depth of at least about 40% of the original modulation depth for more than about 3 years. As such, the display, 101, remains effective even after a 3 year period.

Figure 4A:
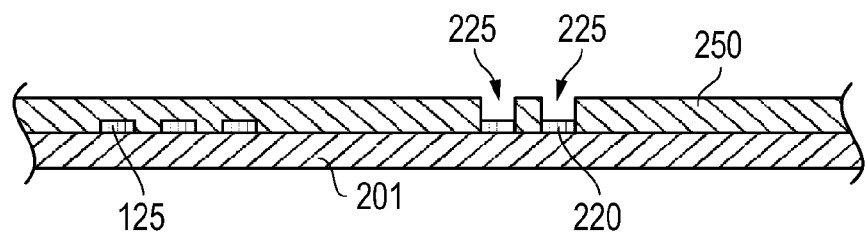
FIG. 4A is a side, cross-sectional view of an embodiment of a patterned backplane substrate for an electrochromic display module.
Figure 4B:
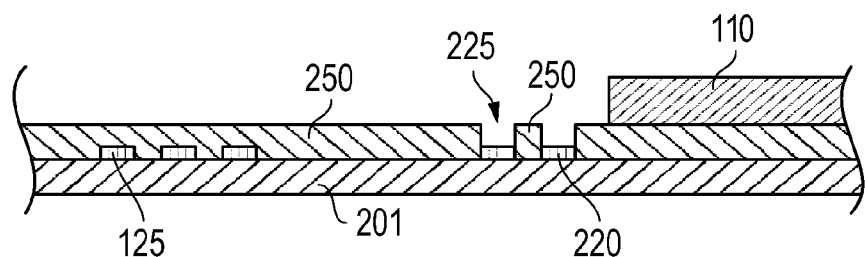
FIG. 4B is a side, cross-sectional view of the substrate of FIG. 4A with an embodiment of a seal positioned thereon.
Figure 4C:
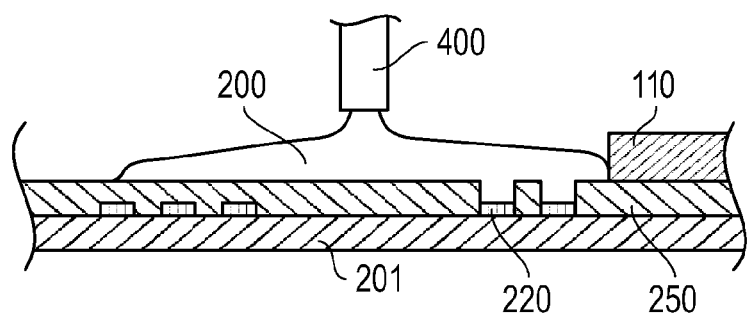
FIG. 4C is a side, cross-sectional view of the substrate of FIG. 4B with the electrochromic display composition of FIG. 3 delivered thereto.

Referring now to FIGS. 4A-4C, embodiments of manufacturing techniques for an electrochromic module 100 such as that of FIG. 1A are briefly described. Namely, a backplane substrate 201 is provided as shown in FIG. 1A with pixel electrodes 220, dielectric 250 and pixels 225 patterned thereon. The patterned backplane 201 may be formed according to conventional metallization, etching and other manufacturing techniques. An extended seal 110 may then be provided as depicted in FIG. 1A to help define the boundary of a display 101. In the embodiment shown in FIG. 4B, the seal 110 may be provided by way of conventional printing or lamination techniques and serve as an adherent to the underlying patterned backplane 201 (via the dielectric 250 in the embodiment shown).

With added reference to FIG. 1A, the boundary of the display portion 101 is defined by the seal 110, at least at the location depicted in FIG. 4C. An embodiment of the composition 200 detailed hereinabove may be provided and held in position by the seal 110. Delivery of the electrochromic composition 200 is preferably made by way of conventional stencil printing techniques. The depiction of FIG. 4C shows a generic delivery tool 400 so as to reveal the enhanced pouring character of the composition 200 as provided by its formulation of low volatility solvent good for solubilizing the polymer, as described hereinabove (e.g. in substantial absence of a separate pouring agent).

The preceding description has been presented with reference to presently preferred embodiments. Persons skilled in the art and technology to which these embodiments pertain will appreciate that alterations and changes in the described structures and methods of operation may be practiced without meaningfully departing from the principle, and scope of these embodiments. For example, higher solubilizing, lower volatility solvents as described herein may also be employed as a manner of reducing conductivity of the composition, thereby reducing charge consumption and further extending the useful life of the electrochromic module. Furthermore, the foregoing description should not be read as pertaining only to the precise structures described and shown in the accompanying drawings, but rather should be read as consistent with and as support for the following claims, which are to have their fullest scope.

We claim:

1. An electrochromic display device comprising an electrochromic composition, said composition comprising: electro-active ink, a sulfone solvent, wherein at least about 50% of said solvent remains in the composition for a duration of at least about 3 years; and particles generated in the composition, said particles remaining less than about 150 microns in size for a duration of at least about 3 years.

2. The electrochromic display device of claim 1 further comprising a pixel of a given modulation depth said pixel configured to retain more than about 40% of the given modulation depth for a duration of at least about 3 years.

3. An electrochromic display device comprising an electrochromic composition, said composition comprising: a solvent having characteristics of a volatility of less than about 0.03 torr at about 20° C. and at least about a 3 year maintainability of at least about 50% retention relative the composition, and particles generated in the composition having a characteristic of less than about 150 microns in size for a duration of at least about 3 years.

4. The electrochromic display device of claim 3 further comprising: a display portion for accommodating said electrochromic composition at a surface of a backplane substrate of the device; and a seal extending from a side of the display portion at a perimeter thereof to beyond about 0.12 inches across the backplane substrate for isolating said electrochromic composition thereat.

5. The electrochromic display device of claim 4 wherein said seal is disposed across a majority of the backplane substrate.

6. The electrochromic display device of claim 3 wherein the solvent is a sulfone.

7. The electrochromic display device of claim 3 wherein the solvent comprises at least about 25% of said electrochromic composition for a duration of at least about 3 years.

8. An electrochromic composition for an electronic display, the composition comprising a substantially soluble polymer solubilized in an electrochemically stable solvent having a volatility of less than about 0.03 torr at about 20° C. and wherein the solvent is sulfone.

9. The electrochromic composition of claim 8 wherein the solvent and solubilizable polymer are of a character allowing at least about 25 wt % of the polymer to remain dissolved in the solvent for a duration of at least about 24 hours at about room temperature.

10. The electrochromic composition of claim 8 wherein the sulfone is tetramethylene sulfone.

11. The electrochromic composition of claim 8 further comprising generated particles, a substantial majority thereof having a size of less than about 150 microns.

12. The electrochromic composition of claim 8 wherein the polymer is 100,000 molecular weight polyethylene oxide.

13. The electrochromic composition of claim 8 wherein said polymer comprises between about 10% and about 15% of the composition and said solvent comprises between about 30% and about 50% of the initial composition.

14. The electrochromic composition of claim 8 comprising less than about 0.5% fumed silica pouring agent.

15. The electrochromic display device of claim 3 further comprising a pixel of a given modulation depth said pixel configured to retain more than about 40% of the given modulation depth for a duration of at least about 3 years.

16. The electrochromic display device of claim 1, wherein said solvent having a volatility of less than about 0.03 torr at about 20° C.

17. An electrochromic display device comprising an electrochromic composition, said composition comprising:
    electro-active ink,
    a solvent,
    a display portion for accommodating said electrochromic composition at a surface of a backplane substrate of the device, and
    a seal extending from a side of the display portion at a perimeter thereof to beyond about 0.12 inches across the backplane substrate for isolating said electrochromic composition thereat.

18. The electrochromic display device of claim 17 wherein said solvent having characteristics of a volatility of less than about 0.03 torr at about 20° C. and at least about a 3 year maintainability of at least about 50% retention relative the composition; and further comprising
    particles generated in the composition having a characteristic of at least about a 3 year size limitation of less than about 150 microns.

* * * * *